(12) United States Patent
Martin et al.

(10) Patent No.: US 10,319,251 B2
(45) Date of Patent: Jun. 11, 2019

(54) NETWORKED ACTIVITY MONITORING VIA ELECTRONIC TOOLS IN AN ONLINE GROUP LEARNING COURSE AND REGROUPING STUDENTS DURING THE COURSE BASED ON THE MONITORED ACTIVITY

(71) Applicant: SCRIYB LLC, Manassas, VA (US)

(72) Inventors: Scott McKay Martin, Fairfax Station, VA (US); Peter Joseph Chick, Alexandria, VA (US); Daniel Sovanndara Te, Woodbridge, VA (US); Brandon Parker Williams, Clifton, VA (US)

(73) Assignee: SCRIYB LLC, Manassas, VA (US)

( * ) Notice: Subject to any disclaimer, the term of this patent is extended or adjusted under 35 U.S.C. 154(b) by 0 days.

(21) Appl. No.: 15/265,579

(22) Filed: Sep. 14, 2016

(65) Prior Publication Data

US 2018/0075766 A1    Mar. 15, 2018

(51) Int. Cl.
*G09B 5/12*  (2006.01)
*G09B 7/00*  (2006.01)
(Continued)

(52) U.S. Cl.
CPC .............. *G09B 5/12* (2013.01); *G06Q 10/10* (2013.01); *G09B 7/00* (2013.01); *H04L 12/185* (2013.01);
(Continued)

(58) Field of Classification Search
CPC ... G09B 7/00; G09B 5/06; G09B 5/12; G06Q 10/10; H04L 12/1822; H04L 12/185;
(Continued)

(56) References Cited

U.S. PATENT DOCUMENTS 7,092,821 B2  8/2006  Mizrahi
8,244,669 B2  8/2012  Ellis
(Continued)

OTHER PUBLICATIONS

Timothy M. Hill, Classroom Participation, 2007, retrieved from the internet http://www.westpoint.edu/cfe/Literature/Hill_07.pdf.*

*Primary Examiner* — Eddy Saint-Vil
(74) *Attorney, Agent, or Firm* — Duncan Galloway Egan Greenwald, PLLC; Kevin T. Duncan

(57) ABSTRACT

A system and method is provided for monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention. The performance information may indicate a performance of a student in the course. The system may provide electronic tools to users. The system may monitor the tools to determine communication and social activity, as well as academic achievement of the students. The communication activity, social activity, and the academic achievement may be used to dynamically regroup students during a course term.

26 Claims, 9 Drawing Sheets

(51) Int. Cl.
  *H04L 12/58* (2006.01)
  *G06Q 10/10* (2012.01)
  *H04L 12/18* (2006.01)
  *H04L 29/08* (2006.01)

(52) U.S. Cl.
  CPC ........ *H04L 12/1822* (2013.01); *H04L 51/046* (2013.01); *H04L 51/16* (2013.01); *H04L 51/32* (2013.01); *H04L 67/22* (2013.01)

(58) Field of Classification Search
  CPC ....... H04L 51/046; H04L 51/16; H04L 51/32; H04L 67/22
  USPC .................................................. 434/322, 323
  See application file for complete search history.

(56) References Cited

U.S. PATENT DOCUMENTS

| | | |
|---|---|---|
| 8,300,557 B2 | 10/2012 | Sekaran |
| 8,417,581 B2 | 4/2013 | Ajjarapu |
| 8,435,038 B2 | 5/2013 | Wilson |
| 8,549,076 B2 | 10/2013 | Mizrahi |
| 8,725,058 B2 | 5/2014 | Bijou |
| 2004/0103118 A1 | 5/2004 | Irving |
| 2004/0161728 A1 | 8/2004 | Benevento |
| 2004/0191744 A1 | 9/2004 | Guirguis |
| 2006/0246412 A1 | 11/2006 | Pieczenik |
| 2007/0299710 A1 | 12/2007 | Haveliwala |
| 2007/0300165 A1 | 12/2007 | Haveliwala |
| 2008/0014569 A1 | 1/2008 | Holiday |
| 2008/0294720 A1 | 11/2008 | Facemire |
| 2009/0325138 A1 | 12/2009 | Shuster |
| 2010/0162135 A1* | 6/2010 | Wanas .................. G06Q 10/10 715/753 |
| 2010/0316985 A1* | 12/2010 | Lloyd ..................... G09B 7/00 434/353 |
| 2011/0117534 A1* | 5/2011 | Berger .................... G09B 7/02 434/350 |
| 2011/0136094 A1 | 6/2011 | Weiler |
| 2011/0244953 A1 | 10/2011 | Pekau |
| 2012/0182384 A1 | 7/2012 | Anderson |
| 2012/0315616 A1* | 12/2012 | Fourman ................. G09B 7/02 434/350 |
| 2012/0317220 A1 | 12/2012 | Atchison |
| 2013/0004929 A1 | 1/2013 | Otwell |
| 2013/0189664 A1 | 7/2013 | Lee |
| 2013/0204942 A1 | 8/2013 | Agarwal |
| 2013/0226645 A1 | 8/2013 | Renaghan |
| 2013/0252223 A1 | 9/2013 | Jadcherla |
| 2013/0309648 A1 | 11/2013 | Park |
| 2013/0316322 A1 | 11/2013 | Roschelle |
| 2014/0272849 A1 | 9/2014 | Bhatia |
| 2014/0315178 A1 | 10/2014 | Ngiam |
| 2014/0335497 A1* | 11/2014 | Gal ......................... G09B 7/00 434/323 |
| 2015/0279225 A1* | 10/2015 | Barber .................... G09B 7/00 434/322 |
| 2016/0275803 A1* | 9/2016 | Martin .................... G09B 5/06 |

* cited by examiner

NETWORKED ACTIVITY MONITORING VIA ELECTRONIC TOOLS IN AN ONLINE GROUP LEARNING COURSE AND REGROUPING STUDENTS DURING THE COURSE BASED ON THE MONITORED ACTIVITY

FIELD OF THE INVENTION

The invention relates to a system and method of monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information.

BACKGROUND OF THE INVENTION

Pre-determined and (sometimes) ad hoc learning achievement criteria, goals, and objectives are assigned by an instructor at the beginning of an academic term for all students. Historically, these expectations are generally conveyed in a course syllabus or course outline at the beginning of a term. As students academically progress through a physical or synchronous virtual classroom, assessments and grades assigned, based on the syllabus content, are summed up (or curved based on the highest grade in the course) to provide a final achievement mark that indicates a student's understanding and level of mastery of the subject matter taught. There is no other tracking mechanism, other than traditional marks, generally assigned post assignment, quiz, or test, within a classroom structure to help an instructor understand when a student may not comprehend the material covered, or understand a certain level of mastery needed to succeed in the next level. As such, it is difficult to assess how a student is progressing in a course during a course term. As a result, in online group learning courses in which students are grouped into groups, it is difficult to assess whether the group to which a student is assigned is beneficial to the student.

What is needed is to be able to assess, during a course term, how a student is progressing in an online group learning course. What is further needed is to be able to monitor networked activity that occurs during a course term to be able to thoroughly assess a student's performance during the course term. However, various technical problems in conventional systems make such assessments difficult. For example, in conventional chat sessions with multiple users (including, in an online group learning context, one or more instructors, and students), it may be difficult to keep track of who is communicating with other users. For instance, conventional multi-user chat message systems do not permit linking messages with one another or identifying a recipient of a chat message from a sender. Furthermore, the transient nature of chat messaging generally makes it more difficult to perform analytics on such messaging. Furthermore, conventional online learning systems typically fail to take into account real-time academic achievement activity, or social connections between users participating in the course.

These and other drawbacks exist with conventional online learning systems.

SUMMARY OF THE INVENTION

The invention addressing these and other drawbacks relates to a system and method of monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention. Each group of students represents an idealized virtual classroom in which members of a given group collectively represent an ideal makeup of students based on their characteristics.

For example, the system may group students registered to take the online group learning course (also referred to hereinafter as "course" for convenience) into an initial set of student groups. One goal of the grouping may be to achieve diversity with respect to at least one characteristic and similarity with respect the same characteristic or other characteristics. The system may initially group the students as disclosed in U.S. patent application Ser. No. 14/658,997, entitled "System and Method for Providing Group Learning via Computerized Student Group Assignments Conducted Based on Student Attributes and Student-Variable-Related Criteria," filed on Mar. 16, 2015, the contents of which are hereby incorporated by reference in its entirety herein.

The system may generate and transmit electronic tools, which may be monitored for networked activity, that instructors and students may use to participate in the course. For example, the system may generate an instructor user interface and a student user interface. The user interfaces may include electronic tools configured to facilitate real-time (e.g., chat) or asynchronous (e.g., electronic mail) communication among the users in a group or class-wide. Such electronic tools may be configured as components of a user interface (e.g., widgets, Adobe® Flash® components, Microsoft® Silverlight™ components, JavaScript components, Java™ components, native user interface components, etc.).

The system may monitor electronic activity via the electronic tools to assess student participation, which may be used to assess a performance of the student during a course term. The electronic tools may also facilitate real-time data aggregation and gathering. For instance, the electronic tools may facilitate aggregation of academic achievement information during a course term. The electronic tools may also facilitate assessing a student's social stature among other users. Individual ones or combinations of the foregoing information may be used to assess students and dynamically regroup the students based on such assessments during a course term, as described herein.

Among other things, the instructor user interface may include various instructor chat interfaces, each associated with a respective group of students. An instructor chat interface may include display options configured to receive a chat input, an intended recipient, a category for the chat, or other display options (e.g., a display option for emoticon entry, file transfer, etc.).

In an implementation, an intended recipient may be optionally input and, when input, may cause the corresponding chat message to include (typically at the beginning of the message) an indicator that identifies the intended recipient (e.g., typically an "@" or other recipient indicator followed by an identifier that identifies the intended recipient). In these implementations, various networked activity listeners of the system may be able to better parse and understand the recipients of each chat message when the intended recipient is input.

In an implementations, a category may be optionally input and, when input, may cause the corresponding chat message to include information that relates to a category (i.e., subject matter) to which the message relates (e.g., typically a "#" or other category indicator followed by the category). The listing of selectable subject matter may be predefined a course parameter, may be predefined at the start of each course session, may be manually input (e.g., typed during a course session), and/or otherwise be adjusted according to particular needs. In these implementations, various networked activity listeners may be able to better understand the nature of what each sender has posted, as well as better link two-way messages that may be occurring. For instance, a chat message augmented with category information, and including a question from a user, may be posted as a chat message. Another chat message from another user may not be posed as a question but also include the category information within a predefined number of intervening chat messages or within predefined time window. In this case, the chat message from the other user may be deemed to be a response to the chat message that posed the question and the two users who posted the messages may be deemed to have interacted with one another. The question may have been posted by a student or an instructor and the answer may have been posted by another student or the instructor, assuming that the two users are different.

In an implementation, the instructor user interface may include an instructor display option configured to receive, from the instructor, academic achievement information relating to a given student. Such information may be received during a course session (e.g., to record any course-session related academic achievement information such as in-class verbal quizzes) or after a course session.

A student user interface may also include a course broadcast portion. Also like the instructor user interface, the student user interface may include a student chat interface, with the exception that the intended recipient listing may include an indicator for the instructor ("@prof"). Also unlike the instructor user interface, a student may be "walled off" from students in other groups. As such, the student user interface may include only a student chat interface for chat messaging with other students in the student's currently assigned group.

In an implementation, the student user interface may include a reputation system portion. The reputation system portion may permit the user to "rep" other users as described herein. A rep may include an indication that the "repped" student should be acknowledged in some way. The student may specify the intended recipient for the rep, as well as an optional category for the rep. It should be noted that the instructor user interface may have a similar rep portion that allows the instructor to rep a student. It should also be noted that the reputation system portion may include an ability of the student to rep an instructor, in which case the rep may be stored for later reviews of the instructor.

The student chat interface may be configured to receive reps as well. For instance, each chat message displayed in the student chat interface may be associated with a chat message identifier, which may be associated with the content of the chat message and a user who submitted the chat message. Each displayed chat message may be configured such that when selected (e.g., clicked), a rep for that chat message may be made possible. In this manner, a user may rep a chat message such that a user who made the chat message receives a rep for a chat message deemed by others to be worthy of acknowledgement.

Via the electronic tools, the system may monitor, during the course term, networked activity (such as networked real-time or asynchronous communications, academic achievement information, social information, etc.). For example, in an implementation, the networked activity listeners may monitor information via the electronic tools and/or other information transmitted over the network in relation to the course. As used herein, a networked activity may include activity that results in at least some information being transmitted over a network. As such, a networked communication may include communications that are transmitted over the network. Networked activity listeners may monitor networked activity in real-time as it occurs and/or later in batches.

In real-time implementations, a web service or other system component may receive information via a user interface and communicate the information to the networked activity listener via a communication bus or a network link. The web service (for example) may then further process the information for its purposes. It should be noted that each activity listener may have a dedicated set of one or more functionalities. For instance, an UI activity listener may be configured to listen for chat messages, listen for electronic mail messages, listen for transmission of academic achievement information, and/or listen for other networked activity. In these instances, the system may direct the networked activity to an appropriate listener. Alternatively or additionally, at least some UI activity listeners may operate at a network layer and monitor data packets being sent to and from a network interface of the system (e.g., a network switch that connects the system to the Internet or other external network).

Instead of or in addition to real-time monitoring, the system may generate an activity log for batch processing. The activity log may record various activity that occurred during a given course session (a given course term may include a number of course sessions). Such activity may include sending/receiving chat messages or electronic mail, uploading/downloading documents, and/or other types of activity that can occur during a course session. Each item in the activity log may be identified by a unique identifier (e.g., a timestamp or other identifier) and/or information describing the item). The activity log may be configured as a discreet file or set of files, a database entry or set of database entries in a database, and/or other data structure that can be traversed or otherwise read.

In an implementation, a networked activity listener may monitor various communications such as chat messages exchanged via the chat interfaces, electronic mail messages (which may be in the form of private messages), and/or other communications. To monitor chat messages, for example, a networked activity listener may monitor real-time chat messages as they occur. In these implementations, the networked activity listener may parse the chat messages as they are received.

For instance, the system may, via the chat interfaces, receive a chat message from a user who is a member of a group (whether as an instructor or a student) and communicate the chat message to the networked activity listener via a communication bus or a network link. The system may transmit the message for real-time presentation to other users in the group (e.g., via respective user interfaces). The networked activity listener may receive, and parse content (e.g., text, emoji metadata, etc.) from, the chat message. The parsed content may then be analyzed in real-time or archived for later analysis. Other types of communications, such as electronic mail, may be similarly parsed in real-time as well.

Similar processing may occur for course-wide communications as well. Furthermore, similar processing may occur for other types of networked activity.

In an implementation, a networked activity listener may be configured to obtain and aggregate academic achievement information obtained via an instructor display option of the instructor user interface.

In an implementation, a networked activity listener may monitor various social information entered via social tools or parsed from the monitored communications. In some implementations, a networked activity listener may monitor various communications (e.g., chat message communications) to determine a social link between two or more users. The strength of the social link may be used to assess the user's social status, which may impact regroupings during the course term. For instance, a user's social status may be based on a number of communications exchanged between two or more users. The social information may be aggregated throughout the course term and may be used, at any time, as a basis for regrouping.

The system may generate a performance score based on the networked activity. Because student performance and other factors may change over time, after each student is initially grouped, the system may, during the course term, generate a performance score based on monitored networked activity from the networked activity listeners. The performance score may be generated based on a communication score determined from the monitored networked communications, an academic achievement score determined from the aggregated academic achievement information, a social score determined from social information indicating social affinities of students, and/or other information. In an implementation, the system may scale each of the communication score, academic achievement score, and social score when two or more of these scores are combined to generate the performance score for a student. Such scaling may be based on weights assigned to each score and such weights may be based on the course parameters.

The system may regroup a student based on the student's performance score. As used herein, the term "regroup" refers to altering the groups in a manner that at least one student is moved from at least a first group to another group. As such, the moved student no longer participates in the group learning course with other members of the first group, and instead participates in the group learning course with members of the other group after the regrouping. In an implementation, at least a first student in a first group is moved to another group other than the first group and a second student in a second group is moved to another group other than the second group. In some instances, the first student and the second student may be swapped. It should be noted that a dynamically regrouped set of groups may be regrouped again during the course term. For example, the instructor may specify, in the course parameters, a number of times that such regrouping should occur. Alternatively or additionally, the system may periodically perform a regrouping, with or without approval from the instructor, based on the performance scores.

The system may dynamically regroup the group based on a local strategy in which individual groups are revised to add or remove students. For instance, a student in a given group who remains in the high group or otherwise maintains a performance score above a predefined threshold performance score (which may be specified by a course parameter) may be permitted to stay in the group. However, if the student falls out of the high group or otherwise has a performance score below a predefined threshold performance score, the student may be moved to another group (that needs a student with the student's performance score such as a group in which a student has newly obtained a performance score that is above the predefined threshold performance score and is to be moved to another group or is otherwise now considered a member of the "high group").

In some implementations, the system may dynamically regroup the groups using a matrix of progress score and factors used to create the original grouping. In this manner, the system may take into account the factors that influenced the original grouping. In these implementations, the system may apply weights to the progress score and the original factors when making regrouping decisions. These weights may be specified by the course parameters.

By taking into account real-time communication, academic achievement, social information to assess a student's performance during a course term, the system allows a redistribution of students into different groups during the course term. As such, optimal groups may be maintained and an under-performing student may be identified so that the student can be grouped with other students who may be able to directly or indirectly improve the student's performance.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information. The performance information may indicate a performance of a student in the course. The system may provide electronic tools to users. The system may monitor the tools to determine communication and social activity, as well as academic achievement of the students. The communication activity, social activity, and the academic achievement may be used to dynamically regroup students during a course term.

As used herein, the term "course term" refers to a period of time in which an online group learning course is conducted. A course term may be delimited by a start time/date and an end time/date. For example, and without limitation, a course term may include a course module, an academic quarter, an academic year of study, etc.). Each course term may include multiple course sessions during which an instructor and students logon to the system to conduct an online class.

Exemplary System Architecture

Figure 1:
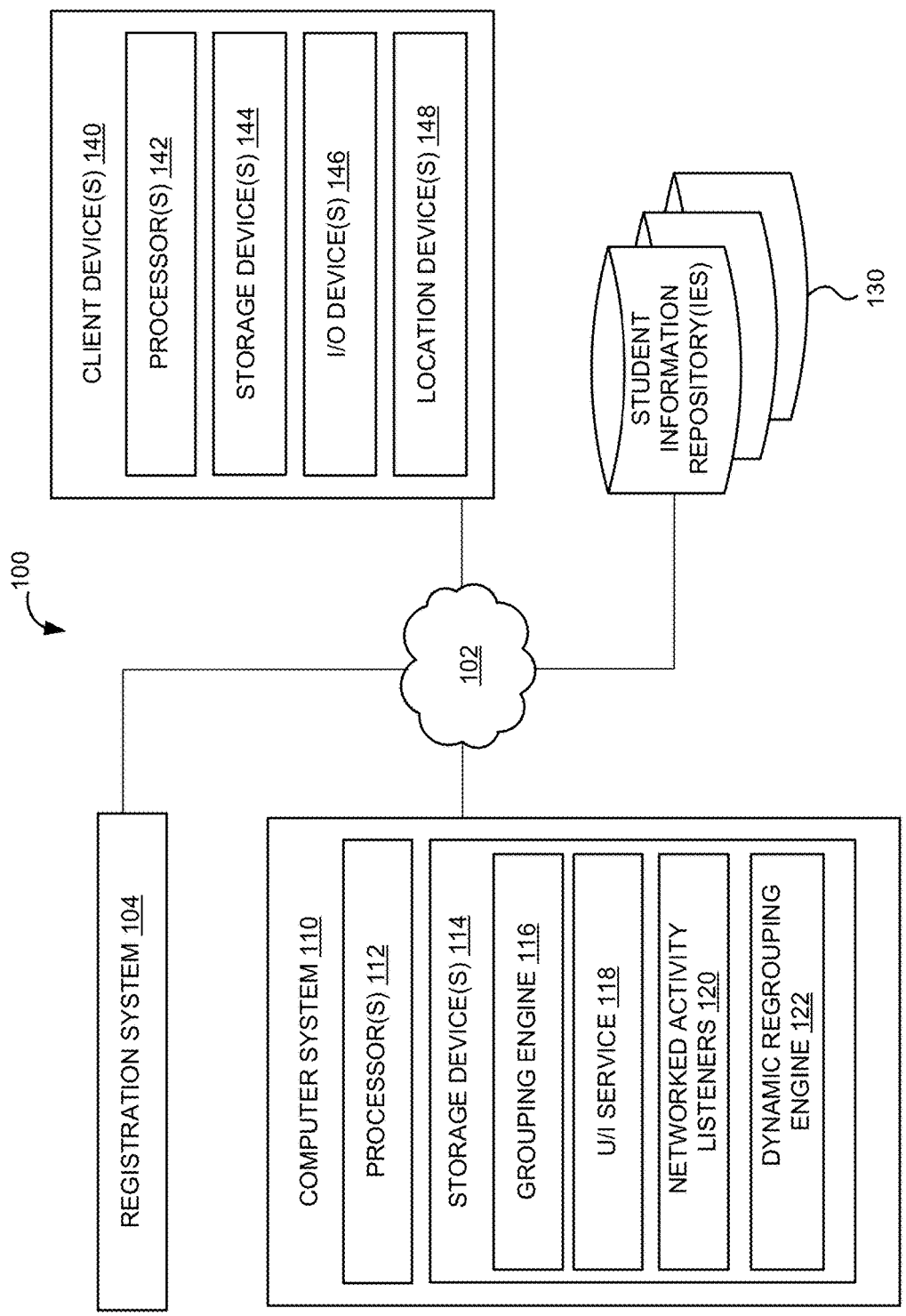
FIG. 1 illustrates a system for monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention.

FIG. 1 illustrates a system 100 for monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention. System 100 may include, without limitation, a registration system 104, a computer system 110, student information repositories 130, client devices 140, and/or other components.

Registration system 104 may be configured to display course listings, requirements, and/or other course-related information. Registration system 104 may receive registrations of students to courses, including online group learning courses described herein. Upon receipt of a registration, registration system 104 may register a student to take a course. During the registration process, registration system 104 may obtain student information such as, without limitation, demographic information, gender information, academic records (e.g., grades, etc.), profession information, personal information (e.g., interests/hobbies, favorite cities, vacation spots, languages spoken, etc.), and/or other information about the student. Such student information may be stored in a student information repository 130.

Computer system 110 may be configured as a server (e.g., having one or more server blades, processors, etc.), a desktop computer, a laptop computer, a smartphone, a tablet computing device, and/or other device that is programmed to perform the functions of the computer system as described herein.

Computer system 110 may include one or more processors 112 (also interchangeably referred to herein as processors 112, processor(s) 112, or processor 112 for convenience), one or more storage devices 114, and/or other components. The one or more storage devices 114 may store various instructions that program processors 112. The various instructions may include, without limitation, grouping engine 116, User Interface ("UI") services 118, networked activity listeners 120 (hereinafter also referred to as "listeners 120" for convenience), a dynamic regrouping engine 212, and/or other instructions. As used herein, for convenience, the various instructions will be described as performing an operation, when, in fact, the various instructions program the processors 112 (and therefore computer system 110) to perform the operation. It should be noted that these instructions may be implemented as hardware (e.g., include embedded hardware systems).

Figure 2:
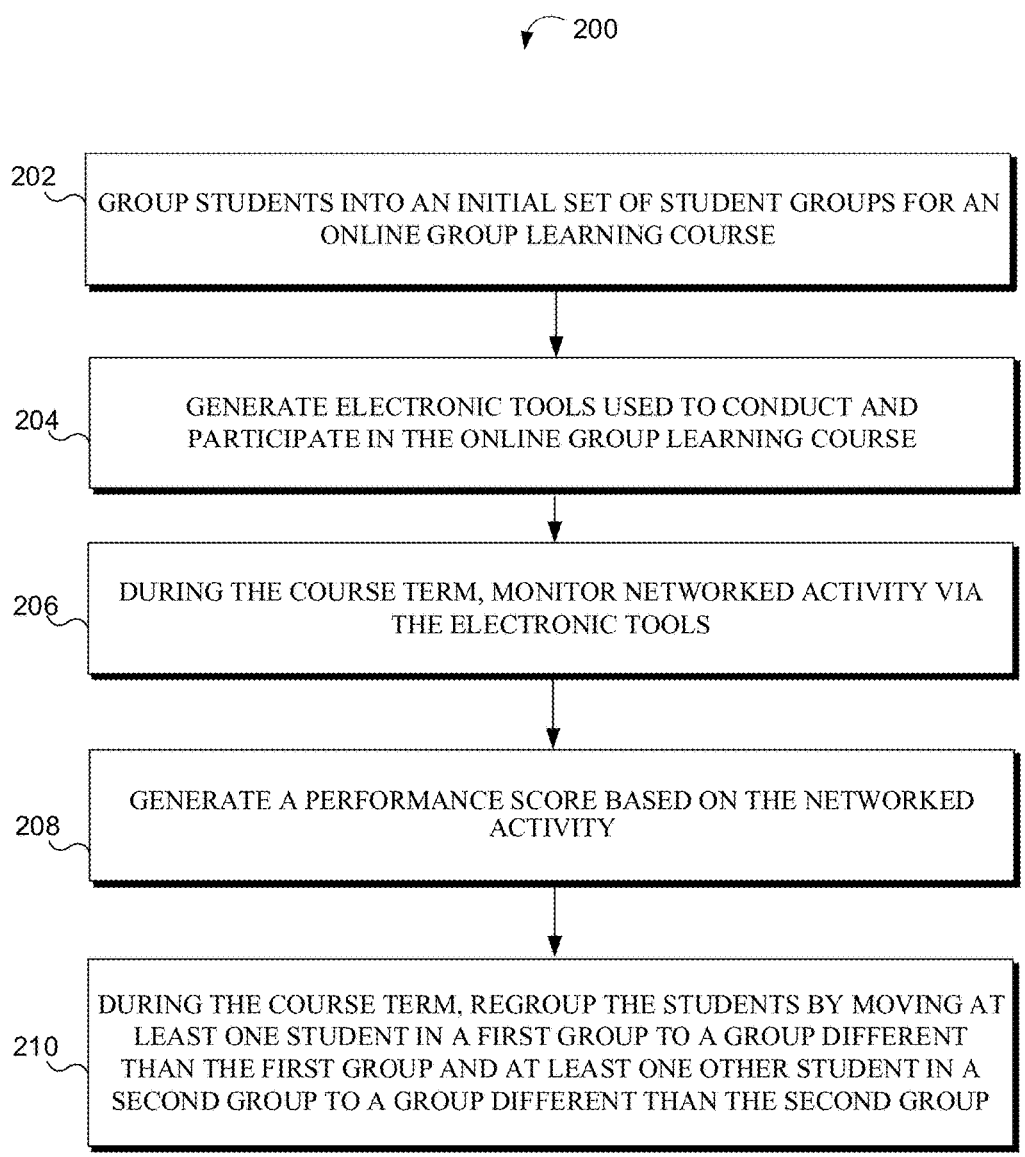
FIG. 2 illustrates a process of the system for monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention.

FIG. 2 illustrates a process 200 of the system for monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, according to an implementation of the invention.

Assigning the Students to Initial Groups

In an operation 202, process 200 may include grouping the registered students into an initial set of student groups. For example, grouping engine 116 may initially assign registered students into groups based on course parameters and various student characteristics. In an implementation, before the course term starts, an instructor of a course may input values for the course parameters that specify grouping criteria (e.g., group size, characteristics by which to group students, etc.). Some or all course parameters may include default parameter values if not specified by the instructor. The default parameter values may be defined by a system developer or administrator.

One goal of the grouping may be to achieve diversity with respect to at least one characteristic and similarity with respect the same characteristic or other characteristics. In this manner, a given group of students may be both similar and dissimilar, thereby promoting an optimal learning environment. In particular, a high academic achiever (e.g., as defined as a top N percentile performer using conventional academic metrics such as grades) may be grouped with a low academic achiever (e.g., as defined as a bottom X percentile performer using conventional academic metrics) (where N and X may be specified by the course parameters that define such performance groupings). Likewise, within the same group, a high academic achiever may be grouped with other high academic achievers. Other characteristics may likewise be used to group students, as will be described herein.

Grouping engine 116 may initially group the students as disclosed in U.S. patent application Ser. No. 14/658,997, entitled "System and Method for Providing Group Learning via Computerized Student Group Assignments Conducted Based on Student Attributes and Student-Variable-Related Criteria," filed on Mar. 16, 2015, the contents of which are hereby incorporated by reference in its entirety herein. Such group assignments may be unknown to the student (e.g., upon logging into the system, the student may be unaware of that student's group assignment or even that a group assignment has been performed).

Generating Electronic Tools Used to Conduct and Participate in the Course

In an operation 204, process 200 may include generating an instructor user interface and a student user interface for users to conduct and participate in the online group learning course. For example, in an implementation, UI service 118 may generate and transmit various user interfaces used by users (e.g., instructors, students, etc.) to conduct and participate in the course. UI service 118 may be configured as a web service or other service that can generate and transmit user interfaces via the network 102. The user interfaces may include electronic tools configured to facilitate real-time (e.g., chat) or asynchronous (e.g., electronic mail) communication among the users in a group or class-wide. Such electronic tools may be configured as components of a user interface (e.g., widgets, Adobe® Flash® components, Microsoft® Silverlight™ components, JavaScript components, Java™ components, native user interface components, etc.).

As will be described in the sections that follow, the system may monitor electronic activity via the electronic tools to assess student participation, which may be used to assess a performance of the student during a course term. The electronic tools may also facilitate real-time data aggregation and gathering. For instance, the electronic tools may facilitate aggregation of academic achievement information during a course term. The electronic tools may also facilitate assessing a student's social stature among other users. Individual ones or combinations of the foregoing information may be used to assess students and dynamically regroup the students based on such assessments during a course term, as described herein.

In an implementation, UI service 118 may generate and transmit user interfaces depending on a user role. For instance, UI service 118 may generate and transmit an instructor user interface to an instructor and generate and transmit a student user interface to a student. Each user interface may be tailored to the given user to which it is transmitted, but maintain core functionality as described herein. For example, an instructor user interface may be tailored for a given instructor, but include the same set of electronic tools provided to all instructors.

To identify which user interface should be generated and provided to a given user, UI service 118 may receive and authenticate (or have authenticated) user credentials according to one or more conventional authentication techniques (including, for example, username/password, multi-factor authentication schemes, biometric authentication, etc.). Once authenticated, or in parallel with authentication, UI service 118 may obtain a user role for the user, such as through conventional role-based management systems (e.g., using the Lightweight Directory Access Protocol, Customer Relationship Management Systems, etc.). UI service 118 may generate user interfaces accordingly. For instance, a user authenticated as an instructor may be provided with an instructor user interface. Likewise, a user authenticated as a student may be provided with a student user interface. Once generated, UI service 118 may transmit the user interface to the appropriate user over the network 102.

Figure 8:
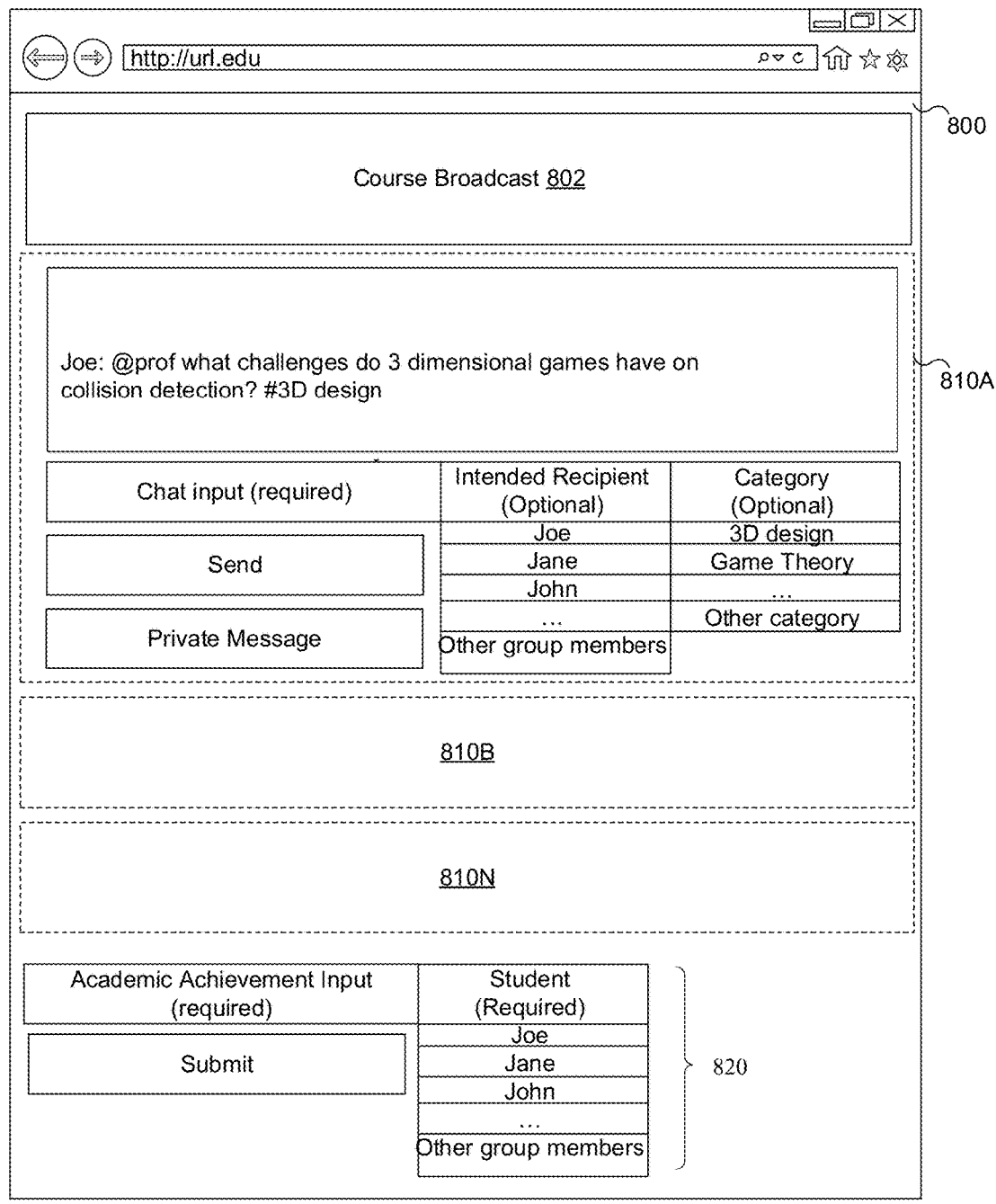
FIG. 8 illustrates an instructor user interface for conducting an online group learning course, according to an implementation of the invention.

FIG. 8 illustrates an instructor user interface 800 for conducting an online group learning course, according to an implementation of the invention. In an implementation, the instructor user interface 800 may include a course broadcast portion 802. This portion may play multi-media such as video and/or audio of a course (in implementations where an instructor is broadcasting live or "taped" course content). The multi-media, which may include a live stream of a course, may be synchronized with electronic communications such as chat messages displayed in a chat interface in real-time. Such synchronization may be based on a time at which the multi-media is initiated (in which the time may be based on a computer system or other clock). Although not illustrated, in some instances, the course broadcast portion 802 may include playback controls (such as pause, rewind and fast forward—in which case, only live or caught up playback of the multi-media content may be synchronized with any chat or other communications).

Instructor user interface 800 may include various instructor chat interfaces 810, each associated with a respective group of students. Only instructor chat interface 810A (e.g., which is used to chat with a first group of students) is shown in detail with other instructor chat interfaces 810B (e.g., which is used to chat with a second group of students) and 810N shown in dashed outline only for convenience. It should be understood, however, that instructor chat interfaces 810B and 810N may include the same display options as instructor chat interface 810A.

Instructor chat interface 810A may include display options configured to receive a chat input, an intended recipient, a category for the chat, or other display options not illustrated (e.g., a display option for emoticon entry, file transfer, etc.). The chat input may be required and may receive content such as text to be displayed in a chat window that display chat messages for the first group.

In an implementation, an intended recipient may be optionally input and, when input, may cause the corresponding chat message to include (typically at the beginning of the message) an indicator that identifies the intended recipient (e.g., typically an "@" or other recipient indicator followed by an identifier that identifies the intended recipient). In these implementations, various networked activity listeners 120 may be able to better parse and understand the recipients of each chat message when the intended recipient is input.

In an implementations, a category may be optionally input and, when input, may cause the corresponding chat message to include information that relates to a category (i.e., subject matter) to which the message relates (e.g., typically a "#" or other category indicator followed by the category). The listing of selectable subject matter may be predefined a course parameter, may be predefined at the start of each course session, may be manually input (e.g., typed during a course session), and/or otherwise be adjusted according to particular needs. In these implementations, various networked activity listeners 120 may be able to better understand the nature of what each sender has posted, as well as better link two-way messages that may be occurring. For instance, a chat message augmented with category information, and including a question from a user, may be posted as a chat message. Another chat message from another user may not be posed as a question but also include the category information within a predefined number of intervening chat messages or within predefined time window. In this case, the chat message from the other user may be deemed to be a response to the chat message that posed the question and the two users who posted the messages may be deemed to have interacted with one another. The question may have been posted by a student or an instructor and the answer may have been posted by another student or the instructor, assuming that the two users are different. In an implementation, instructor user interface 800 may include an instructor display option 820 configured to receive, from the instructor, academic achievement information relating to a given student. Such information may be received during a course session (e.g., to record any course-session related academic achievement information such as in-class verbal quizzes) or after a course session. As such, the instructor display option 820 and the instructor chat interfaces 810 need not necessarily exist within the same user interface. Likewise, the various components of the instructor user interface 800 and other user interfaces described herein need not be presented with one another in the same user interface.

Figure 9:
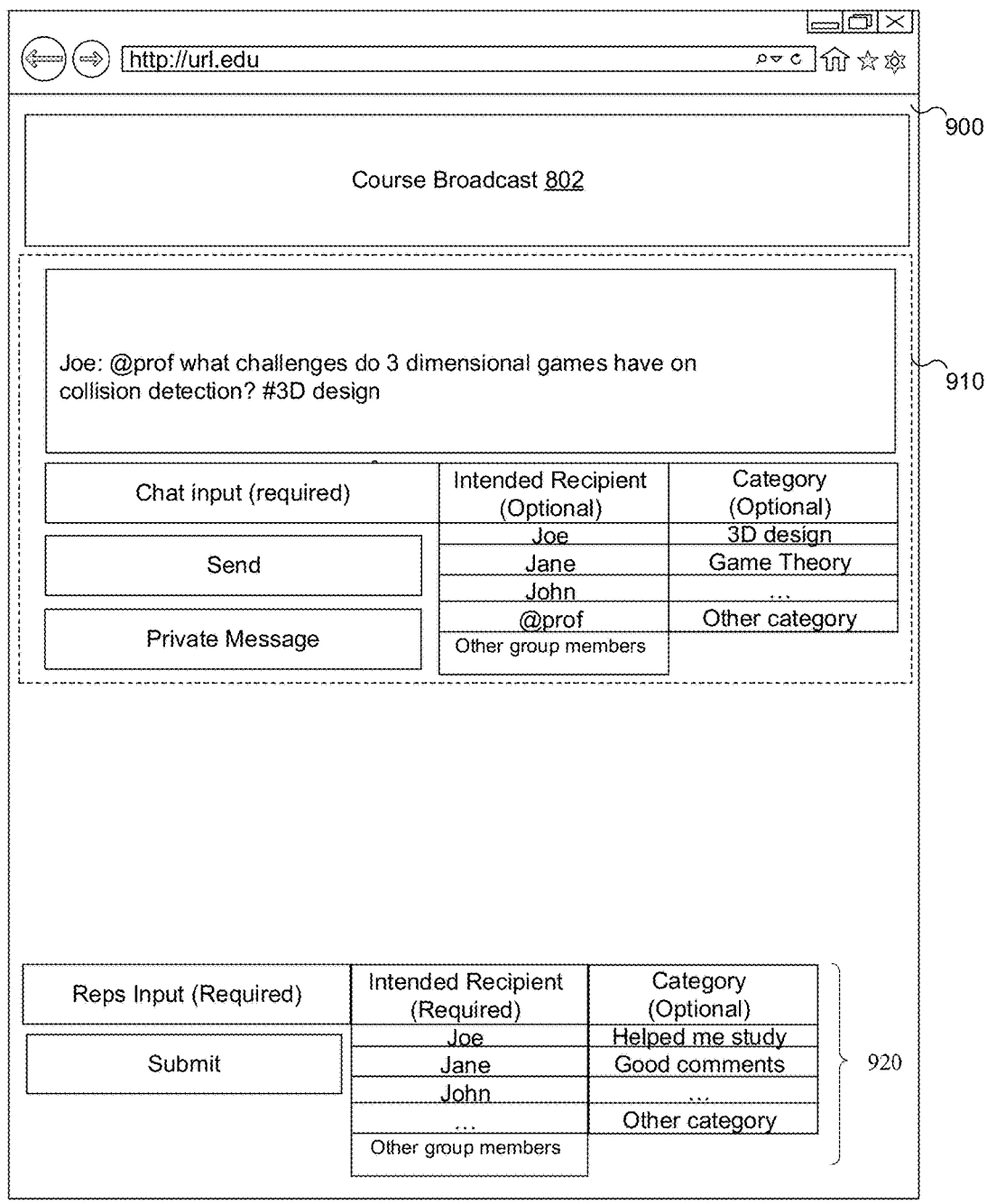
FIG. 9 illustrates a student user interface for participating in an online group learning course, according to an implementation of the invention.

FIG. 9 illustrates a student user interface 900 for participating in an online group learning course, according to an implementation of the invention. As illustrated, like the instructor user interface 800, a student user interface 900 may include a course broadcast portion 802, which may be synchronized with electronic communications such as chat messages presented in a chat interface. Also like the instructor user interface 800, the student user interface 900 may include a student chat interface, with the exception that the intended recipient listing may include an indicator for the instructor ("@prof"). Also unlike the instructor user interface 800, a student may be "walled off" from students in other groups. As such, the student user interface 900 may include only a student chat interface for chat messaging with other students in the student's currently assigned group.

In an implementation, student user interface 900 may include a reputation system portion 920. The reputation system portion 920 may permit the user to "rep" other users as described herein. A rep may include an indication that the "repped" student should be acknowledged in some way, as set forth in the Reps Input. The student may specify the intended recipient for the rep, as well as an optional category for the rep. Although not illustrated in FIG. 8, it should be noted that the instructor user interface 800 may have a similar rep portion that allows the instructor to rep a student. It should also be noted that the reputation system portion 920 may include an ability of the student to rep an instructor, in which case the rep may be stored for later reviews of the instructor.

Although not illustrated, student user interface 900 may include various navigation options to navigate to a home page of the system, a course catalog, and the courses to which the student has access. In some instances, customize displays such as a link to a student account page, logout, student's rep score/value, and student's name may be displayed as well. In some instances, student user interface 900 may include a class list that indicates students who have joined the chat and are watching the course broadcast.

Although not illustrated, the student chat interface 910 may be configured to receive reps as well. For instance, each chat message displayed in the student chat interface 910 may be associated with a chat message identifier, which may be associated with the content of the chat message and a user who submitted the chat message. Each displayed chat message may be configured such that when selected (e.g., clicked), a rep for that chat message may be made possible. In this manner, a user may rep a chat message such that a user who made the chat message receives a rep for a chat message deemed by others to be worthy of acknowledgement.

As used herein, to transmit a user interface to a user, the system may transmit the user interface to a device that provided the user credentials for authentication. As further used herein, to generate and transmit a user interface may include generating information that can be used to render a user interface (including components thereof) and transmitting such information over the network 102. Such information may include, without limitation, instructions, metadata, links to instructions or metadata, and/or other information that a device that receives such information uses to render the user interface (e.g., on a display of the receiving device). Generating the information may include, for example, using a pre-stored template that includes the information, and then customizing the template for the user for which the user interface is intended. Such customizations may include, for example, including the name of the user, or custom links or other content (e.g., electronic mail, messages, graphics, calendar information, etc.) intended for the user.

Monitoring Networked Activity Via the Electronic Tools

Returning to FIGS. 1 and 2, in an operation 206, process 200 may include monitoring, during the course term, networked activity (such as networked real-time or asynchronous communications, academic achievement information, social information, etc.) via the electronic tools. For example, in an implementation, networked activity listeners 120 may monitor information via the electronic tools and/or other information transmitted over the network 102 in relation to the online group learning course. As used herein, a networked activity may include activity that results in at least some information being transmitted over the network 102. As such, a networked communication may include communications that are transmitted over the network 102. Networked activity listeners 120 may monitor networked activity in real-time as it occurs and/or later in batches.

In real-time implementations, UI service 118 may receive information via a user interface and communicate the information to the networked activity listener 120 via a communication bus or a network link. UI service 118 may then further process the information for its purposes. It should be noted that each activity listener 120 may have a dedicated set of one or more functionalities. For instance, an UI activity listener 120 may be configured to listen for chat messages, listen for electronic mail messages, listen for transmission of academic achievement information, and/or listen for other networked activity. In these instances, UI service 118 may direct the networked activity to an appropriate listener. Alternatively or additionally, at least some UI activity listeners 120 may operate at a network layer and monitor data packets being sent to and from a network interface of computer system 110 (e.g., a network switch that connects the computer system 110 to the Internet or other external network).

Instead of or in addition to real-time monitoring, UI service 118 may generate an activity log for batch processing. The activity log may record various activity that occurred during a given course session (a given course term may include a number of course sessions). Such activity may include sending/receiving chat messages or electronic mail, uploading/downloading documents, and/or other types of activity that can occur during a course session. Each item in the activity log may be identified by a unique identifier (e.g., a timestamp or other identifier) and/or information describing the item). The activity log may be configured as a discreet file or set of files, a database entry or set of database entries in a database, and/or other data structure that can be traversed or otherwise read.

Monitoring Networked Communications

In an implementation, a networked activity listener 120 may monitor various communications such as chat messages exchanged via chat interfaces 810, 910 (referring to FIGS. 8 and 9), electronic mail messages (which may be in the form of private messages), and/or other communications. To monitor chat messages, for example, a networked activity listener 120 may monitor real-time chat messages as they occur. In these implementations, networked activity listener 120 may parse the chat messages as they are received.

For instance, UI service 118 may, via the chat interfaces 810, 910 (referring to FIGS. 8 and 9), receive an chat message from a user who is a member of a group (whether as an instructor or a student) and communicate the chat message to the networked activity listener 120 via a communication bus or a network link, and transmit the message for real-time presentation to other users in the group (e.g., via respective user interfaces). The networked activity listener 120 may receive, and parse content (e.g., text, emoji metadata, etc.) from, the chat message. The parsed content may then be analyzed in real-time or archived for later analysis. Other types of communications, such as electronic mail, may be similarly parsed in real-time as well. Similar processing may occur for course-wide communications as well. Furthermore, similar processing may occur for other types of networked activity. For convenience, subsequent examples of activity monitoring will be described in the context of real-time processing, although the activity monitoring and subsequent analysis may be performed in either or both real-time or batch processing.

Aggregating Academic Achievement Information

In an implementation, a networked activity listener 120 may be configured to obtain and aggregate academic achievement information obtained via instructor display option 820. Examples of academic achievement information that may be aggregated and analyzed is discussed with reference to FIG. 3. In this manner, academic achievement information may be aggregated throughout the course term and may be used, at any time, as a basis for regrouping.

Monitoring Social Information

In an implementation, a networked activity listener 120 may monitor various social information entered via social tools or parsed from the monitored communications. In some implementations, a networked activity listener 120 may monitor various communications (e.g., chat message communications) to determine a social link between two or more users. The strength of the social link may be used to assess the user's social status, which may impact regroupings during the course term. For instance, a user's social status may be based on a number of communications exchanged between two or more users. Further examples of social information that may be monitored is discussed with reference to FIG. 5. The social information may be aggregated throughout the course term and may be used, at any time, as a basis for regrouping.

Assessing Performance Via the Monitored Electronic Tools

In an operation 208, process 200 may include generating a performance score based on the networked activity. Because student performance and other factors may change over time, after each student is initially grouped by the grouping engine 116, during the course term, dynamic regrouping engine 122 may generate a performance score based on monitored networked activity from the networked activity listeners 120. The performance score may be generated based on a communication score determined from the monitored networked communications, an academic achievement score determined from the aggregated academic achievement information, a social score determined from social information indicating social affinities of students, and/or other information. In an implementation, regrouping engine 122 may scale each of the communication score, academic achievement score, and social score when two or more of these scores are combined to generate the performance score for a student. Such scaling may be based on weights assigned to each score and such weights may be based on the course parameters.

Generating an Academic Achievement Score

In an implementation, dynamic regrouping engine 122 may obtain aggregated academic achievement information, such as the academic achievement information from a networked activity listener 120, and generate an academic achievement score based on the academic achievement information.

Figure 3:
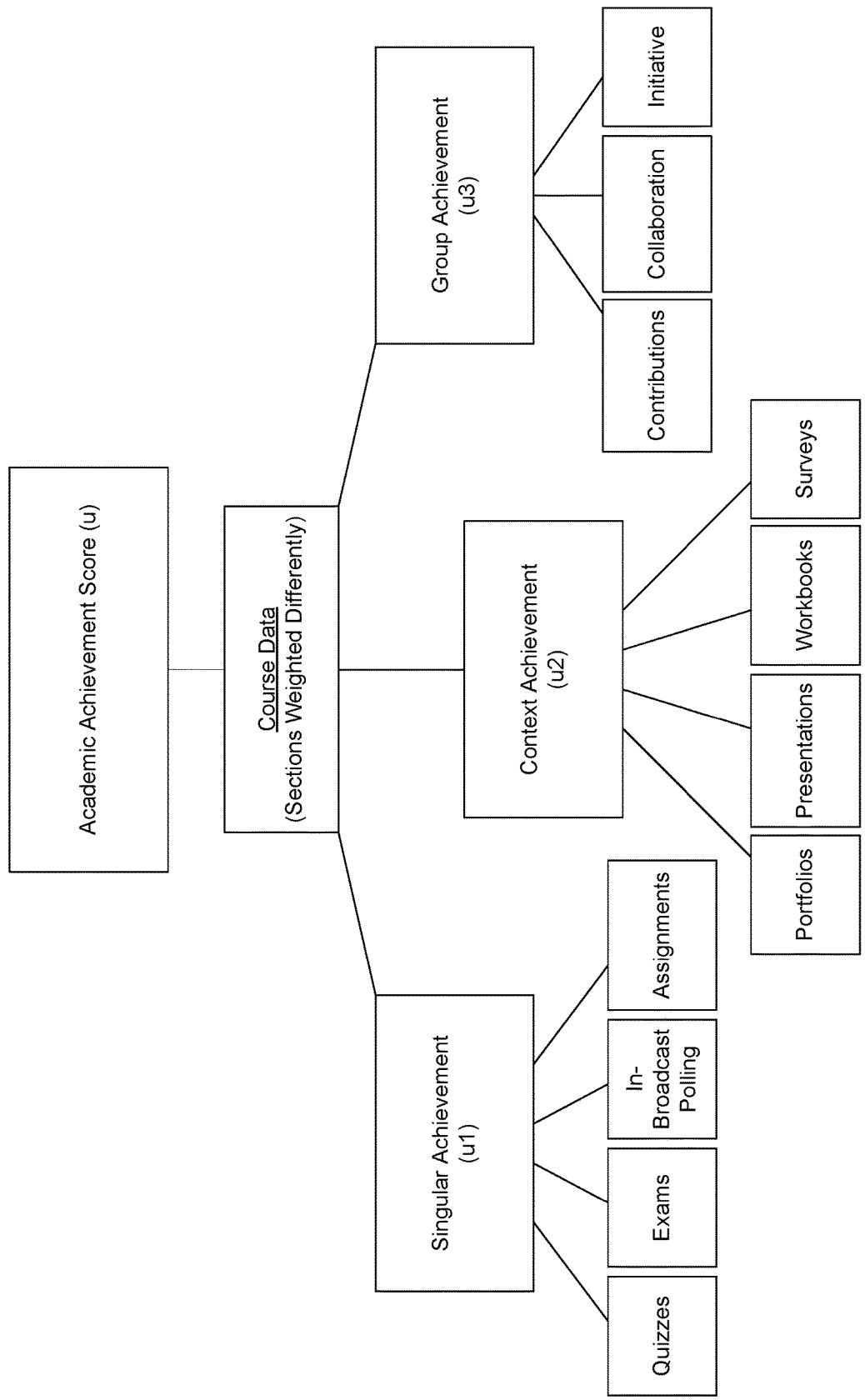
FIG. 3 illustrates a schematic diagram of aggregated achievement information, which is a component of performance information for regrouping students during a course term, according to an implementation of the invention.

Referring to FIG. 3, an academic achievement score (u) may reflect a measurement of a student's academic performance within a synchronous or asynchronous virtual classroom (e.g., also referred to herein as a "class session") based on predetermined academic criteria during a course term. As students academically progress through the course, assessments (e.g., grades) may be assigned and input by an instructor as previously described. The assessments may summed up (or curved) to provide a final achievement mark that indicates a student's understanding and level of mastery of the subject matter taught during the course.

The academic achievement score (u) may include one or more sub-scores, including, without limitation, a singular achievement sub-score (u1), a context achievement sub-score (u2), a group achievement sub-score (u3), and/or other sub-scores.

A singular achievement sub-score (u1) may be based on results of exams, quizzes, assignments, etc. The singular achievement sub-score (u1) is typically, though not necessarily, based on a grading scale of 0-100. The singular achievement sub-score (u1) directly measures the student's basic academic performance in the course. The singular achievement sub-score (u1) is typically, though not necessarily, weighted the most of any of the academic achievement sub-variables, since the dynamic grouping process is based around creating an optimal learning environment to maximize academic performance.

A context achievement sub-score (u2) may be based on results of context-based assignments that are discipline-specific. Context-based assignments may include, without limitation, portfolios, presentations, workbooks, surveys, and/or other assignments completed by the student for the course.

A group achievement sub-score (u3) may be based on the results of group participation work such as contributions, collaboration, student initiative, and/or other participation in group activities. As such, the group achievement sub-score (u3) may reflect an individual student's team contributions, collaborations, and initiatives measured within group assignments Each of the sub-scores may be weighted differently to produce the overall academic achievement score. Such weights may be input by the instructor and stored as a course parameter. It should be noted that any time an academic achievement score is generated by the dynamic regrouping engine 122, it may refer to achievement starting from the start of the course term or starting from the last time a regrouping was performed. In this sense, the achievement score may reflect cumulative academic performance throughout the course term to date or recent academic performance since the last time a regrouping was made.

In an implementation, dynamic regrouping engine 122 may normalize the sub-scores. For example, the sub-scores may be normalized to a scale of 0-100, although other values may be used as well. As previously noted, the academic achievement information used to generate the academic achievement score (including sub-scores) may be received in real-time via the instructor user interface. As such, the system may store and track academic performance as such information is input into the system.

In an implementation, dynamic regrouping engine 122 may generate the academic achievement score (u) based on the following non-limiting examples illustrated by equations (1) and (2). The following examples illustrate a weekly assessment of academic achievement in an 8 week course term. Other frequencies of assessments and other lengths of course terms may be used as well.

To determine an academic achievement score (u) for a first week, dynamic regrouping engine 122 may use Equation (1):

$$u=(u1\Sigma^*(W_{u1}))/f+(u2\Sigma^*(W_{u2}))/f+(u3\Sigma^*(W_{u3}))/f \quad (1),$$

wherein:

u1 is the singular achievement sub-score (usually input as a value between 0 and 100), u2 is the context achievement sub-score (usually input as a value between 0 and 100), u3 is the group achievement sub-score (usually input as a value between 0 and 100), $W_{u1}$ is the weight for u1, $W_{u2}$ is the weight for u2, $W_{u3}$ is the weight for u3, and f is the frequency To determine an academic achievement score (u) for each week for each student, dynamic regrouping engine 122 may use Equation (2):

$$u(t+dt)=u(t)=d(u)=u(t)=ru(t)dt=u(t)[1+r\,dt] \quad (2),$$

wherein:

r=0.16 (for 8 weeks) and a time step of one week (0.020)

Generating a Communication Score

In an implementation, dynamic regrouping engine 122 may obtain monitored networked communication information (which may reflect electronic communications among students and an instructor during the course term), such as the monitored networked communication information from a networked activity listener 120, and generate a communication score (k) based on the monitored networked communication information.

Figure 4:
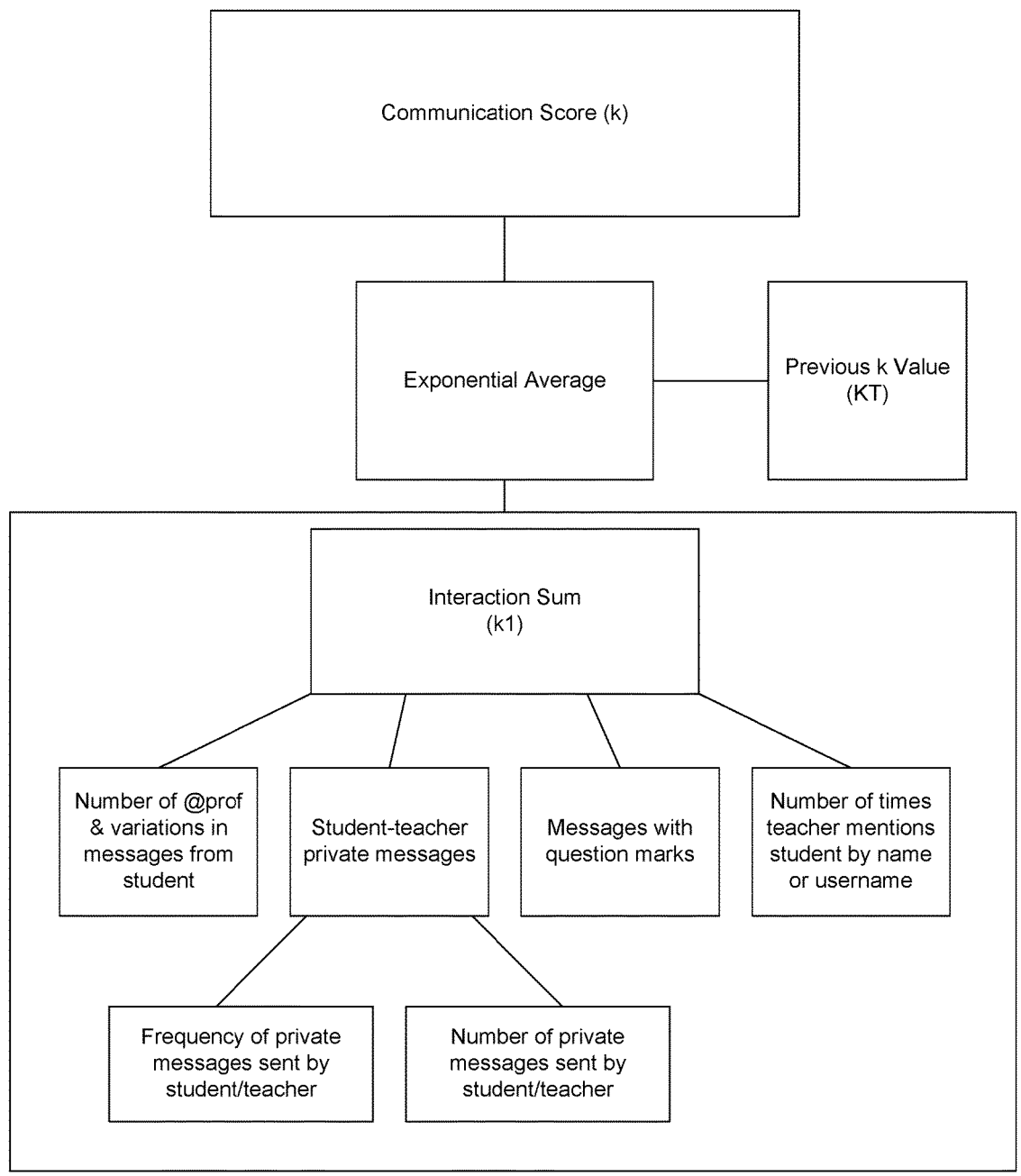
FIG. 4 illustrates a schematic diagram of monitored communication information, which is a component of performance information for regrouping students during a course term, according to an implementation of the invention.

Referring to FIG. 4, a communication score (k) may reflect a level of participation (and therefore engagement) by a student in the course. For example, assessing student communications may reveal a level of initiative that a student is taking in order to clarify questions/concerns, which can be directly correlated with a higher overall grade in the course. If a student is having minimal communication with an instructor, then the grouping algorithm may regroup this student to a different group where he may have a higher likelihood of communicating with the instructor, thus potentially leading to a higher overall grade in the course. For instance, the student may be regrouped with other students who (based on empirical data during the course term and other course terms) tend to encourage participation by other students during a course session.

Listed under "Interaction Sum (k1)" in FIG. 4, messages with question marks is a factor included as well. Based on chat data analysis, there is a general trend where whenever a question is entered into the chat without mentioning a specific person, they are generally referring to the instructor on the live stream. Then, the instructor usually answers the question from the chat directly on the live stream as opposed to sending a message in the chat. This pattern is why it's necessary to include messages with question marks under the interaction sum sub-variable (k1). In some implementations, the communication score (k) will not be accessible to instructors for adjustment.

Figure 6:
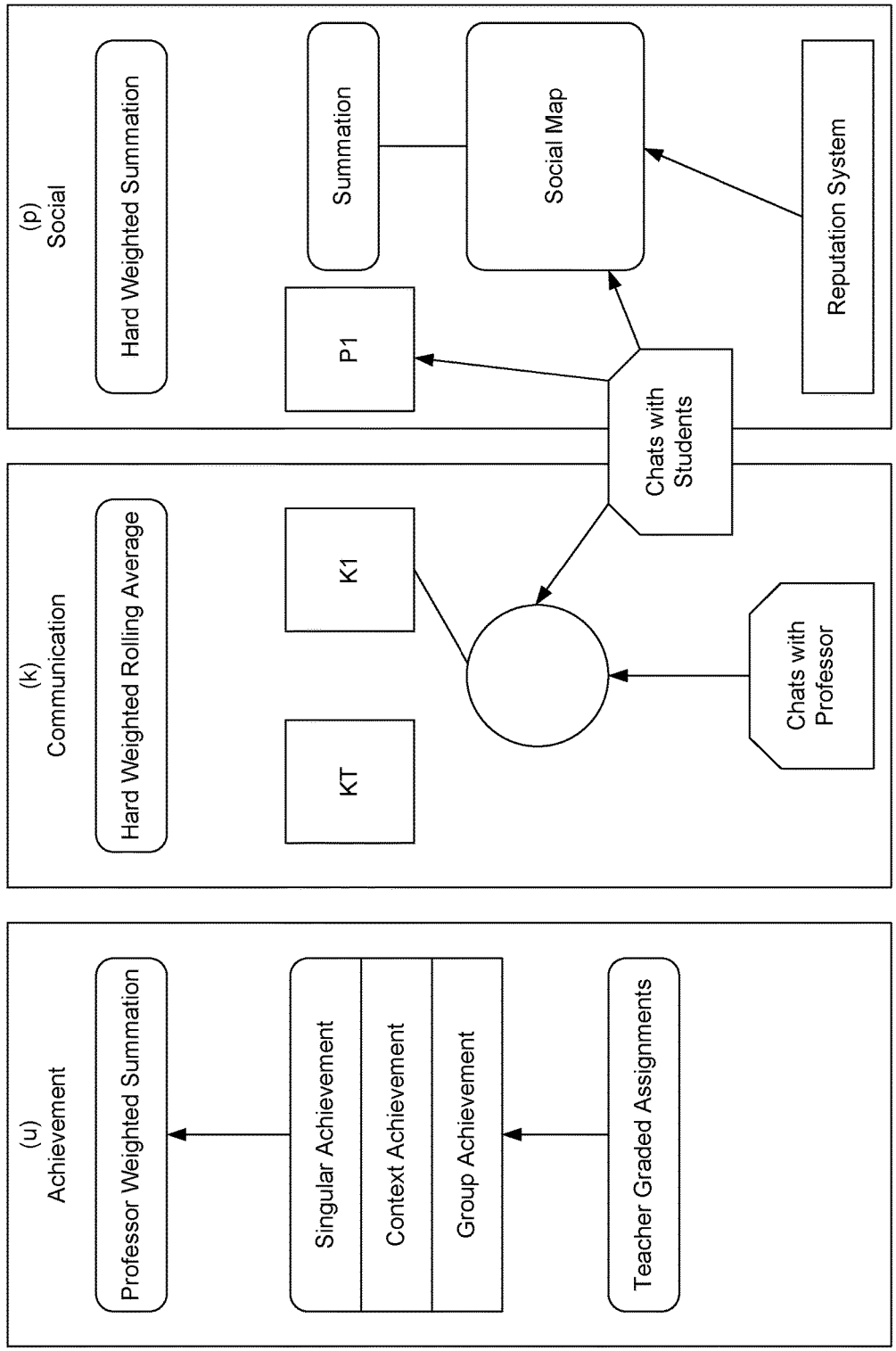
FIG. 6 illustrates a schematic diagram of a combination of types of performance information for regrouping students during a course term, according to an implementation of the invention.

Communication, as outlined in FIG. 6, takes into account two variable groups; one large variable group alongside a variable group that serves as an exponential moving average: Student/Instructor interaction, number of messages directed at student from professor in chat, number of messages directed at professor from student in chat, number of private messages sent by either student/instructor, and other factors implying student/instructor interaction. Exponential moving average, previous value(s) of (k) averaged to prevent wild swings in the value.

In an implementation, as illustrated, the communication score (k) may be based on an exponential average of both an interaction sum (k1) and a previous communication score (k) (a previous communication score k may be denoted "(KT)"). Using an exponential average of the foregoing values may prevent swings in the communication score (k). The interaction sum variable (k1) may be based on one or more student-to-instructor factors, including, without limitation, the number of times the student mentions the instructor in the chat, enters questions not directed to anybody specific in the chat, and the number/frequency of student-to-instructor messages. In addition to or instead of student-to-instructor factors, instructor-to-student factors may be included in the interaction sum (k1). The instructor-to-student factors may include the number of private messages sent by instructor to student, the number of times instructor mentions student by name or username (with @ if applicable), etc. The foregoing factors may be assessed based on content parsed from an electronic communication (e.g., chat message, electronic mail, etc.) by a networked activity listener 120, as previously described.

Communication between student/instructor typically (though not necessarily) consists of questions, answers, and concerns. Determining that a given chat message is a student-to-instructor communication may readily discerned, because students often use the @prof or other designation in the chat to address the instructor. However, the same cannot often be said for instructor-to-student communication, as instructors often communicate with students via the live stream, making it difficult to completely measure instructor-to-student communication. This limits the ability to measure instructor-to-student communication to only private messaging and the occasional chat message.

In order to address some of these technical deficiencies, the networked activity listeners 120 may be configured to predict which messages are directed from the instructor to a given student. For instance, a networked activity listener 120 may determine that a prior message from a student is directed to an instructor based, for example, on a determination that the prior message includes an interrogatory indicator (e.g., a question mark or certain interrogatory words or phrases such as 'what,' 'where,' etc.). The networked activity listener 120 may then monitor chats or other messages from the instructor and determine whether any key words or phrases (other than common words such as 'the', 'at', etc.) are also present in the prior message. If so, networked activity listener 120 may deduce that the instructor's message is a response to the student. In other instances, the UI service 118 may include various tools for the instructor and student to include metadata in their chats and other messages such that networked activity listeners 120 may be able to easily discern the topic and/or intended recipient of a message, as discussed with reference to FIGS. 8 and 9.

In an implementation, a measure of an individual student's and instructor interaction, (k1), may be given by the sum: total number of @instructor_label (where "@instructor_label" may refer to a predefined label such as "@prof" for the instructor)+@instructor+@[instructor username]+all variations thereof, number of messages within class time, number of messages within class time with @prof and equivalent, number of messages outside of class time with @prof and equivalent, all of the above repeated only including messages with "?", number of private messages with professor (when implemented), number of private messages sent by professor to student, number of times professor mentions student by name or username (with @ if applicable), number of times professor mentions student after they mentioned the instructor.

Previous values of (k) may be averaged to generate an averaged value (kt) in order to prevent swings in the value.

In an implementation, dynamic regrouping engine 122 may generate a communication score (k), based on Equation (3):

$$k=KT+(W_{[k1\text{-}KT]})[(W_{k1})(k1)-(KT)] \quad (3),$$

wherein:
$W_{[k1\text{-}KT]}$ is the Weight of k1–KT, and
$W_{k1}$ is the weight of k1.

Dynamic regrouping engine 122 may generate communication scores for each week for each student/instructor, over an 8-week module, based on Equation (4):

$$k(t+dt)=u(t)=d(k)=k(t)=rk(t)dt=k(t)[1+r\ dt] \quad (4),$$

wherein
r=0.16 (8 weeks) and a time step of one week (0.020).

Generating a Social Score

In an implementation, dynamic regrouping engine 122 may obtain monitored social information (which may reflect social affinities among students and an instructor during the course term), such as the monitored social information from a networked activity listener 120, and generate a social score (p) based on the monitored networked communication information.

Figure 5:
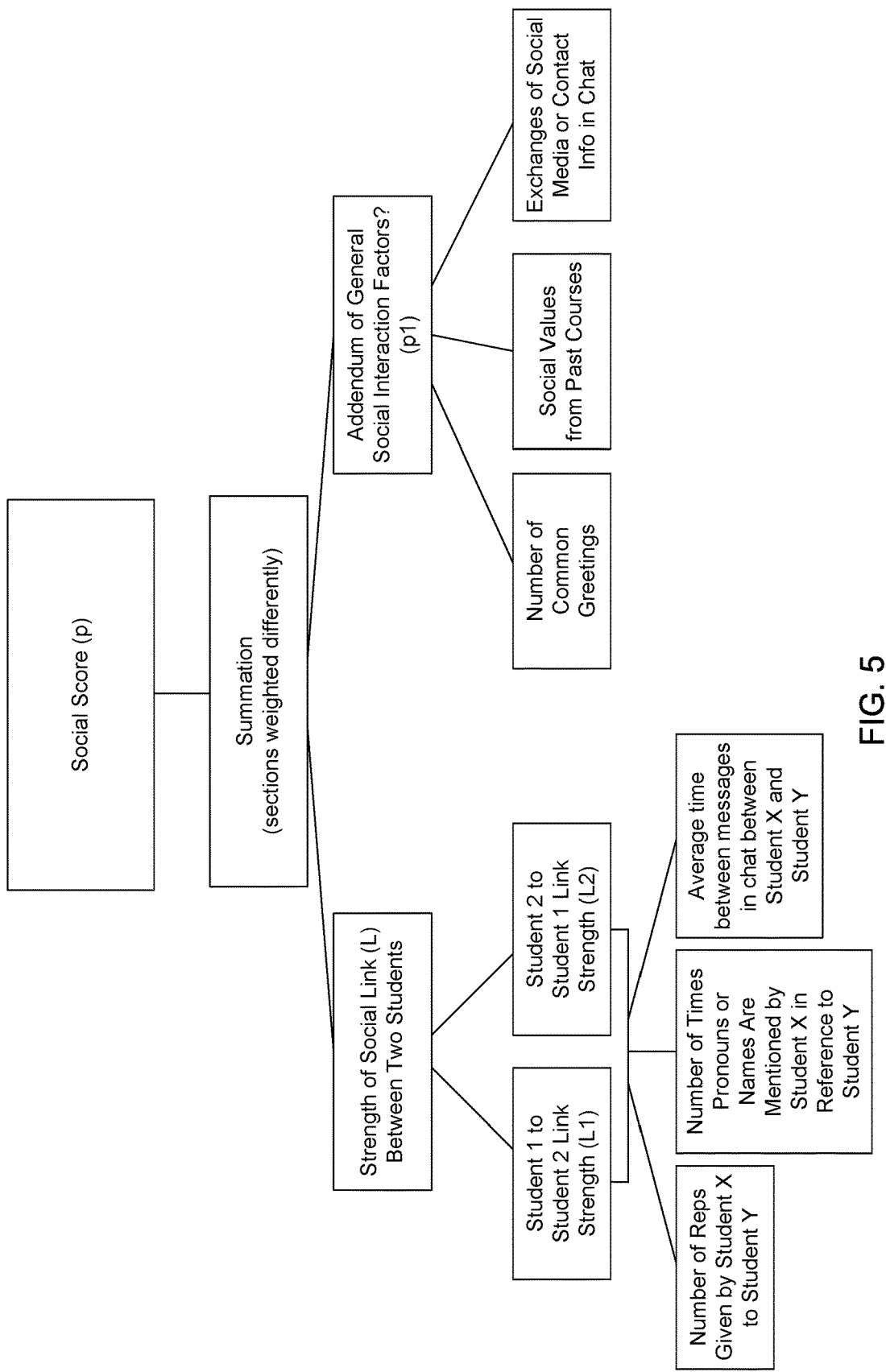
FIG. 5 illustrates a schematic diagram of monitored social information, which is a component of performance information for regrouping students during a course term, according to an implementation of the invention.

Referring to FIG. 5, a social score (p) may be based on a strength of a social link (L) between two students, an addendum of general social interaction factors (p1), and/or other factors. Dynamic regrouping engine 122 may sum the number of social links (L) together with the addendum of general social interaction factors (p1) to generate a social score (p) for a student. The addendum of general social interaction factors (p1) may be based on the number of common greetings, social values in past courses, and the exchanges of social media/contact information in the chat. The number of social links (L) may be segmented into: Student1-Student2 link strength (L1) and Student2-Student1 link strength (L2). The factors for (L) that constitute a "link" include the number of reps given by student X to student Y, the number of times pronouns or names are mentioned by student X in reference to student Y, and the average time between messages from student X and student Y.

The social interaction variable (p) can be mathematically described using the following formula: p=[the weight of L]sum(L . . . Ln)+[the weight of p1](p1)

To determine the Social Interaction results for each week for each student, over an 8-week module we use:

$$p(t+dt)=u(t)=d(p)=p(t)=rp(t)dt=p(t)[1+r\ dt]$$

where r=0.16 (8 weeks) and a time step of one week (0.020)

As described above with respect to the student user interface, a student may reward other students for providing assistance (giving answers, instructions, other help, etc) in the form of reputation points, or "rep" (also referred to herein as an indication that the other student should be recognized). Each student has an individual number associated with their user account (e.g., the user account that is authenticated upon log on to the system), called their "reputation". This number may increase/stay the same based on the number of times other students "rep" one another.

In an implementation, each time the rep function is initiated (i.e., when one student reps another student), dynamic regrouping engine 122 may keep track of which student "repped" another student and which student was "repped." In this manner, dynamic regrouping engine 122 may assess a social standing of a user based on the number of reps received and/or given. FIG. 6 displays the flow of data in the generation of each of the scores, each of the Academic Achievement, Communication, and Social Scores may be used to generate the performance score. In some instances, dynamic regrouping engine 122 may weight each score, and such weights may be based on the course parameters, which may be set by an instructor.

In an implementation, as previously noted, dynamic regrouping engine 122 may generate a composite performance score based on the Academic Achievement, Communication, and Social Scores.

Dynamically Re-Grouping Students Based on the Assessed Performance

In an operation 210, process 200 may regroup the students based on the assessed performance. For instance, the dynamic regrouping engine 122 may regroup a student based on the student's performance score. As used herein, the term "regroup" refers to altering the groups in a manner that at least one student is moved from at least a first group to another group. As such, the moved student no longer participates in the group learning course with other members of the first group, and instead participates in the group learning course with members of the other group after the regrouping. In an implementation, at least a first student in a first group is moved to another group other than the first group and a second student in a second group is moved to another group other than the second group. In some instances, the first student and the second student may be swapped. It should be noted that a dynamically regrouped set of groups may be regrouped again during the course term. For example, the instructor may specify, in the course parameters, a number of times that such regrouping should occur. Alternatively or additionally, the dynamic regrouping engine 122 may periodically perform a regrouping, with or without approval from the instructor, based on the performance scores.

Figure 7:
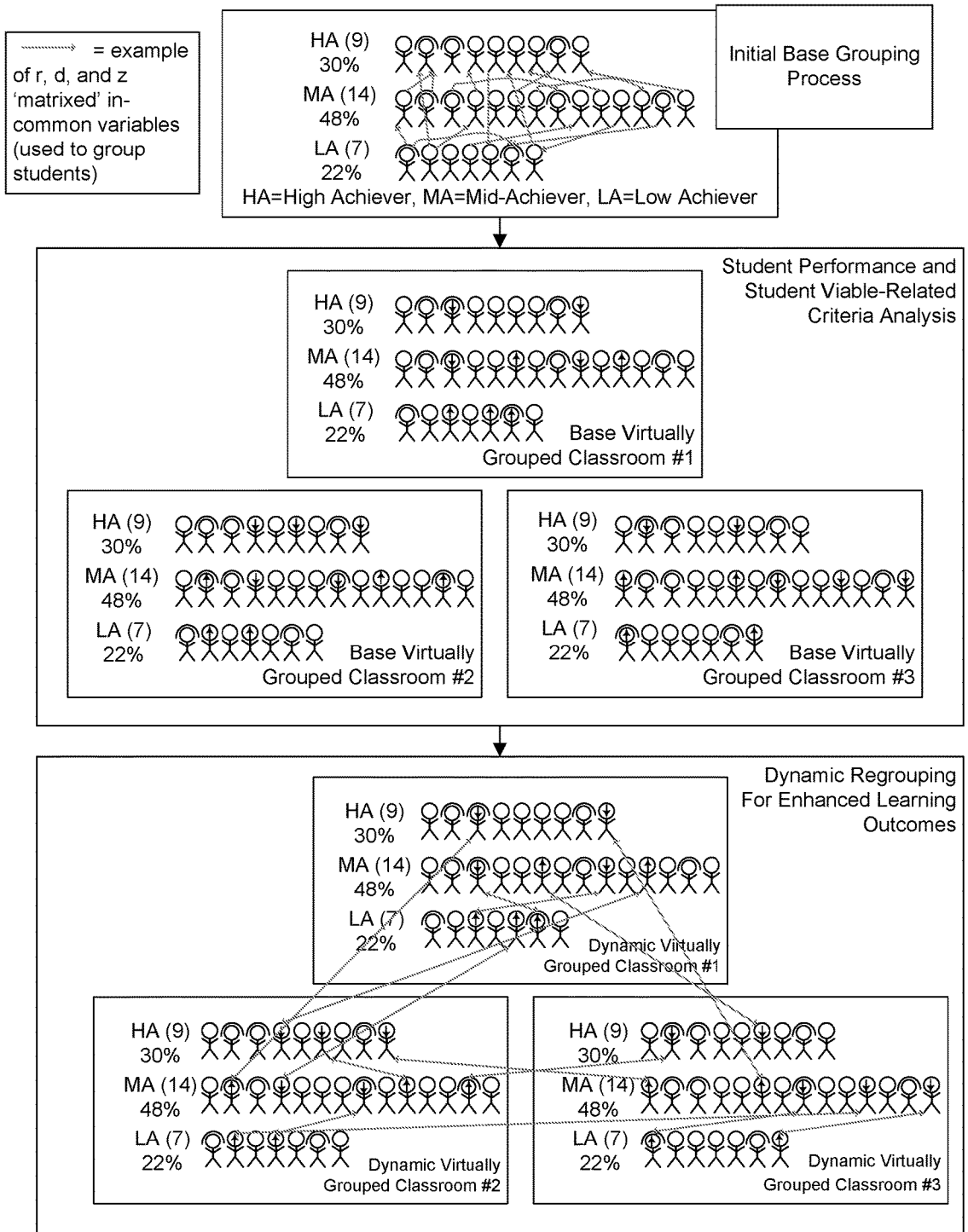
FIG. 7 illustrates a schematic diagram of regrouping students during a course term based on monitored and aggregated performance information, according to an implementation of the invention.

Referring to FIG. 7, a student initially assigned to a group may be regrouped to another group, as described herein. In an implementation, dynamic regrouping engine 122 may generate a progress score for each student. The progress score may be based on the student's academic achievement score (u), communication score (k), and social interaction (p) of in-class students (which may—though not necessarily—include only student-student interactions) is conducted. As illustrated, various students may be moved to other groups based on their progress scores. The dynamic regrouping engine 122 regroup students such that each group includes a set of top N students, a set of middle M students, and a set of bottom X students, where N, M, and X are values that may be specified by the course parameters and each relate to a progress score. For instance, dynamic regrouping engine 122 may rank all students according to their progress score. Each group should have N number of students having high progress scores, M number of students having middle progress scores, and X number of students having low progress scores. "High" may be defined as a "top 20 percent" progress score, "middle" may be defined as a "middle 60 percent" progress score and "low" may be defined as a "lowest 20 percent" progress score. The precise number of bins (high, medium, low) and the value of each of the bins (20, 60, 20) may be specified by the course parameters.

Dynamic regrouping engine 122 may dynamically regroup the group based on a local strategy in which individual groups are revised to add or remove students. For instance, a student in a given group who remains in the high group or otherwise maintains a performance score above a predefined threshold performance score (which may be specified by a course parameter) may be permitted to stay in the group. However, if the student falls out of the high group or otherwise has a performance score below a predefined threshold performance score, the student may be moved to another group (that needs a student with the student's performance score such as a group in which a student has newly obtained a performance score that is above the predefined threshold performance score and is to be moved to another group or is otherwise now considered a member of the "high group").

In some implementations, the dynamic regrouping engine 122 may dynamically regroup the groups globally. For illustrative purposes, assuming a number of groups should be three, dynamic regrouping engine 122 may place the top 3 students by progress score into three separate groups. The dynamic regrouping engine 122 may place the next 3 students by progress score into the three separate groups, and continue this process until all students have been regrouped.

In some implementations, the dynamic regrouping engine 122 may dynamically regroup the groups using a matrix of progress score and factors used to create the original grouping. In this manner, the dynamic regrouping engine 122 may take into account the factors that influenced the original grouping. In these implementations, the dynamic regrouping engine 122 may apply weights to the progress score and the original factors when making regrouping decisions. These weights may be specified by the course parameters.

Client Devices 140

Client device 140 may be configured as a personal computer (e.g., a desktop computer, a laptop computer, etc.), a smartphone, a tablet computing device, and/or other device that can be programmed to participate in a grouped online course. Client device 140 may include one or more physical processors 142 programmed by computer program instructions stored at storage devices 144. A client device 140 may include one or more input/output ("I/O") devices 146, one or more location devices 148 (e.g., a Global Positioning System receiver that receives coordinates from satellites or other above-head devices), and/or other types of devices. The location devices 148 may provide location information that indicates a location of the client device 140 to computer system 110. Such location information may be used by the computer system to group and/or regroup students.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The student information repositories 130 and other databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The described operations of FIG. 2 and other process diagrams may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an illustrative (though non-limiting) operation, for a virtual synchronous classroom of 30 students or less, instructor-to-student interaction (micro-data), peer-to-peer student academic (and social) interactions, and academic achievement information may be tracked and recorded (e.g., by the networked activity listeners 120). The foregoing may be matrixed together on a day-to-day (or session-to-session) basis, or when an output variable is identified, such as student academic interaction with other students within the virtual classroom, student answers an instructor's questions, student doesn't answer other student or instructor's questions over a time stamped period, or results of student assignment, quiz, or test.

By monitoring and tracking the foregoing information, a student's (course) 'silhouette' that describes and defines a student's knowledge level and comprehension aptitude within the subject matter being taught may be determined. This student 'silhouette' is them matched and compared to other students in the same virtual synchronous classroom. If the target student's 'silhouette' is in the upper 40% in achievement, creativity, and aptitude of the other students in the virtual synchronous classroom of 30 or less students, on a day-by-day basis, then the student remains in the same virtual synchronous classroom. If the target student does not perform academically at or above the 40% threshold, and demonstrates a lower than 40% achievement, creativity, and aptitude compared to the other students in the virtual class, the student is dynamically moved seamlessly to an idealized virtual classroom (e.g., another group) prior the next synchronous virtual classroom meeting. If academic achievement and aptitude changes the following week or days, the student is moved back to the original virtual classroom, or to another idealized (for the student) virtual classroom. If the student's 'silhouette' performs above the 30%, the student is moved to again a different virtual classroom, and so on. Each of these student virtual classroom moves exists within the same course, same term, and taught by the same instructor, but the student is being placed in the best synchronous small virtual classroom for optimal academic outcomes throughout a term (Module, academic quarter, semester or year).

As an example, an instructor's 90 virtual students are grouped based on grouping engine 116. The students in each virtual classroom include 30% High Achievers (9 students), 48% Mid-Achievers (14 students), and 22% Low Achievers (7 students) as a base, at the beginning of a course term. The data set that determines each student base data, academic/aptitude, and personal interests' outcomes within a virtual classroom (course) may be as follows:

Base(r), Education (x), and Personal (z)
r=Address, Birthdate, Sex, Race, Name
x=School, grade level, major (or major interest), highest GPA, Graduation year
z=Profession (or interest), outside interests and activities, hobbies, languages, favorite city, favorite vacation spot.

Three distinct variable group IDs (r, x, z) may result for each registered student. These IDs are then further compared and matrixed with the IDs of the other thousands of students that have registered for the same course (same time and day), resulting in a matching or 'grouping' to produce the most demographically and intellectually balanced, age appropriate, interest and experienced appropriate, like-minded students in a subclass of 30 or less for each course.

The r, x, and z variables may be matrixed, weighted, and calculated according to the below formula:

| r Matrix Variable | |
|---|---|
| Factor | Weight |
| Address | A |
| Birthday | B |
| Sex | C |
| Race | D |
| Name | E |

Address may be obtained via student input or location information from a location device of the user's client device. Birthdate may be used to calculate an age based on current date. The system may determine a similarity between student 1 and student 2 based on r data. The measure of similarity may be given by (Dbetween), which is a measure of distance between student 1 and student 2. Abetween=age difference between student 1 and student 2. Cgender=This is a boolean if both genders are the same enter 1, if both are different, enter 0. Drace=1 if same (assuming limited # of options) 1=100%. 0.5 if partial (assuming people can check multiple boxes of a limited # of options). Whoareyou=1 if they are the same if not, 0.

Basic_Similarity=$A^*(1/(D\text{between}))+B^*(1/(A\text{be-tween})+C^*(C\text{gen})+D^*(D\text{race})+E^*(\text{Whoareyou})$.

The system may adjust weights as outlined below.

| d Matrix Variable: | |
|---|---|
| Factor | Weight |
| School | F |
| Grade LV | G |
| Major | H |
| GPA | I |

WSchool=1 if the same school, 0 if not
GLv1=Notate the grade level (4-12): If equal 1, **will check
If any 1/0 error
WMajor=1 If Same Major, 0 if not same major, 0.5 if in same school
MyGPA=GPA2−GPA1

Education_Similarity=$F^*(1/(W\text{School}))+G^*(1/(G1v1)+H^*(W\text{Major})+w\ I^*(1/(\text{MyGPA}))$.

The system may adjust weights as outlined below.

| z Matrix Variable: | |
|---|---|
| Factor | Weight |
| Profession | J |
| Interests | K |

-continued

| z Matrix Variable: | |
|---|---|
| Factor | Weight |
| Hobbies | L |
| Language | M |
| Fav City | N |
| Fav Vacation Spot | O |

WProfession=1 if the same profession, 0 if not, 0.5 if similar
WInterests=1 if same interests, 0 if not, 0.5 if similar
WHobbies=1 if same hobbies, 0 if not, 0.5 if similar
WLanguage=1 if same, 0 if not
FCity=1 if same, 0 if not, 0.5 if similar
FVS=1 if same, 0 if not, 0.5 if similar $$Personal\_Similarity = J*(1/(WProfession) + K*(1/(WInterests) + L*(WHobbies) + M*(WLanguage) + N*(FCity) + O*(FVS).$$

The system may adjust weights as outlined below.
High Achievers: 30%
Mid-Achievers: 48%
Low Achievers: 22%
Male-to-Female Ratio: 25%-50%
Age Brackets: 6-9, (10-12, 13)-(15, 16-18), 19-24, 25-36, 37-43, 44-55, 56-70
Race: 12%-33%
Schools: If Students, Local School Grouping
Region: Local Region Grouping (Precinct, Address, Zip)

These percentages are maximums, and if a particular course roster doesn't produce these ideal profiles, percentages for each category drop downward, still attempting a mean average to create the ideal learning environment for each subclass within a course by using the following approach:
Student Achievement Level:
WGPA=GPA*GPA weight
HGPA=Highest value of WGPA
LGPA=Lowest value of WGPA
Assign Range: AGPA=([HGPA . . . LGPA]/3)
AGPA=3 sub-ranges of highest to lowest GPA
If Achievement falls in
AGPA 1: High Achievers=(AGPA1/WGPA)*100
AGPA2=Mid Achievers=(AGPA2/WGPA)*100
AGPA 3=Low achievers=(AGPA3/WGPA)*100
Sex Ratio:
T=Total
M=Male
F=Female
% Male=(M/T)*100%
Female=(F/T)*100
Race Ratio:
T=Total
N=Non-Caucasian
C=Caucasian
% Non=(N/T)*100%
Caucasian=(C/T)*100

The various user interfaces described herein may take the form of web pages, smartphone application displays, MICROSOFT WINDOWS or other operating system interfaces, and/or other types of interfaces that may be rendered by a client device. As such, any appearance or depictions of various types of user interfaces provided herein are illustrative purposes.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of monitoring and aggregating, via a network, performance information that indicates scholastic achievement and electronic communications of students participating in an online group learning course, conducted electronically via the network during a course term, in which the students are initially grouped into groups and then regrouped during the course term based on the aggregated performance information, the system comprising:

a computer system comprising one or more physical processors programmed by computer program instructions that, when executed, cause the computer system to:

perform a grouping of a set of students for the online group learning course by comparing a set of attributes associated with each student in the set of students with a set of group criteria information for the online group learning course to assign each student in the set of students to a group from a set of groups, wherein each group of students in the set of groups is walled off from each other group of students in the set of groups restricting electronic messaging access to students within the walled off group of students;

generate an instructor user interface, the instructor user interface comprising a first instructor chat interface configured to allow an instructor to participate in a first chat message session that includes a first set of chat messages among students of a first group from the set of groups and the instructor, a second instructor chat interface configured to allow the instructor to participate in a second chat message session that includes a second set of chat messages among students of a second group from the set of groups and the instructor, and an instructor display option configured to receive, from the instructor, academic achievement information relating to a given student;

generate a first student user interface comprising a first student chat interface configured to allow a first student from the first group of students to participate in the first chat message session;

generate a second student user interface comprising a second student chat interface configured to allow a second student from the second group of students to participate in the second chat message session;

transmit, via a network, the instructor user interface to the instructor of the course, the first student user interface to the first student in the first group, and the second student user interface to the second student in the second group;

monitor at least the first chat message session by at least one networked activity listener integrated into each of the instructor user interface, the first student user interface, and the second student user interface, the at least one networked activity listener configured to determine the source, destination, and content of each chat message in the first chat message session;

generate at least a first communication score for the first student based on the monitored first chat message session;

generate at least a first academic achievement score for the first student based on first academic achievement information related to the first student received via the instructor display option;

generate a first performance score for the first student based on the first communication score and the first academic achievement score, the first performance score comprising a matrix of the first communication score, the first academic achievement score, and the set of attributes associated with each student;

determine that the first student should be moved from the first student group to the second student group based on the first performance score; and reassign, during the course term, the first student from the first student group to the second student group responsive to the determination that the first student should be moved from the first student group to the second student group based on the first performance score.

2. The system of claim 1, wherein the computer system is further programmed to:

obtain student information relating to a plurality of students registered to take the course during the course term;

generate, based on one or more grouping criteria and the student information, an initial grouping of the plurality of students, the initial grouping comprising at least the first group and the second group.

3. The system of claim 2, wherein the computer system is further programmed to:

determine, based on the student information, a characteristic for the first student, the second student, and a third student in the second student group;

determine that the characteristic for the first student is different than the characteristic of the second student and is the same as the characteristic for the third student, wherein the determination that the first student should be moved to the second student group is based further on the determination that the characteristic for the first student is different than the characteristic of the second student and is the same as the characteristic for the third student.

4. The system of claim 1, wherein to monitor at least the first chat message session, the computer system is further programmed to:

count a number of messages from the first student, wherein the first communication score is based on the number of messages.

5. The system of claim 4, wherein to count the number of messages from the first student, the computer system is further programmed to:

parse each of the messages in the first chat message session;

identify the messages in the first chat message session that are from the student and directed to the instructor based on the parse, wherein the first communication score is based on the identified messages from the student and directed to the instructor.

6. The system of claim 5, wherein to identify the messages in the first chat message session that are from the student and directed to the instructor, the computer system is further programmed to:

identify inquiries from the first student to the instructor, wherein the first communication score is based on the number of inquiries from the first student to the instructor.

7. The system of claim 4, wherein to count the number of messages from the first student, the computer system is further programmed to:

parse each of the messages in the first chat message session;

identify the messages in the first chat message session that are from the student to another student based on the parse, wherein the first communication score is based on the identified messages from the student and directed to another student.

8. The system of claim 1, wherein the computer system is further programmed to:

monitor online social interactions between the first student and at least one other student in the first group;

generate a social score based on the online social interactions, wherein the first performance score is based further on the social score.

9. The system of claim 8, wherein the first student user interface further comprises social display option configured to receive an indication from another student in the first group that the first student should be recognized, and wherein to monitor the online social interactions, the computer system is further programmed to determine a number of times that an indication from another student in the first group that the first student should be recognized has been received, wherein the social score is based on the number of times that an indication from another student in the first group that the first student should be recognized has been received.

10. The system of claim 8, wherein to monitor online social interactions between the first student and at least one other student in the first group, the computer system is further programmed to:

determine a number of chat messages between the first student and the at least one other student, wherein the social score is based on the number of chat messages.

11. The system of claim 1, wherein the computer system is further programmed to:

generate a second performance score for the second student; and determine that the second student should be moved to the first group based on the second performance score.

12. The system of claim 11, wherein the computer system is further programmed to:

generate a first ranking of the first student in the first group based on the first performance score;

generate a second ranking of the second student in the second group based on the second performance score; and determine that the first student and the second student should be dynamically regrouped based on the first ranking and the second ranking, wherein the determination that the first student should be moved to the second group based on the first performance score and the determination that the second student should be moved to the first group based on the second performance score is based on the determination that the first student and the second student should be dynamically regrouped.

13. The system of claim 1, wherein the computer system is further programmed to:

generate a first ranking of the first student in the first group based on the first performance score;

determine that the first ranking falls below a threshold ranking value, wherein the determination that the first student should be moved from the first student group to the second student group is based on the determination that the first ranking falls below the threshold ranking value.

14. A computer implemented method of monitoring and aggregating, via a network, performance information that indicates scholastic achievement and social electronic communications of students participating in an online group learning course, conducted electronically via the network during a course term, in which the students are initially grouped into groups and then regrouped during the course term based on the aggregated performance information, the method being implemented in a computer system having one or more physical processors programmed with computer program instructions that, when executed by the one or more physical processors, cause the computer system to perform the method, the method comprising:

generating, by the computer system, a set of groups for a set of students for the online group learning course by comparing a set of attributes associated with each student in the set of students with a set of group criteria information for the online group learning, wherein each group of students in the set of groups is walled off from each other group of students in the set of groups restricting electronic messaging access to students within the walled off group of students;

generating, by the computer system, an instructor user interface, the instructor user interface comprising a first instructor chat interface configured to allow an instructor to participate in a first chat message session that includes a first set of chat messages among students of a first group from the set of groups and the instructor, a second instructor chat interface configured to allow the instructor to participate in a second chat message session that includes a second set of chat messages among students of a second group from the set of groups and the instructor, and an instructor display option configured to receive, from the instructor, academic achievement information relating to a given student;

generating, by the computer system, a first student user interface comprising a first student chat interface configured to allow a first student from the first group of students participate in the first chat message session;

generating, by the computer system, a second student user interface comprising a second student chat interface configured to allow a second student from the second group of students participate in the second chat message session;

transmitting, by the computer system, via a network, the instructor user interface to the instructor of the course, the first student user interface to the first student in the first group, and the second student user interface to the second student in the second group;

monitoring, by the computer system, at least the first chat message session by at least one networked activity listener integrated into each of the instructor user interface, the first student user interface, and the second student user interface, the at least one networked activity listener configured to determine the source, destination, and content of each chat message in the first chat message session;

generating, by the computer system, at least a first communication score for the first student based on the monitored first chat message session;

generating, by the computer system, at least a first academic achievement score for the first student based on first academic achievement information related to the first student received via the instructor display option;

generating, by the computer system, a first performance score for the first student based on the first communication score and the first academic achievement score, the first performance score comprising a matrix of the first communication score, the first academic achievement score, and the set of attributes associated with each student;

determining, by the computer system, that the first student should be moved from the first student group to the second student group based on the first performance score; and reassigning, by the computer system, during the course term, the first student from the first student group to the second student group responsive to the determination that the first student should be moved from the first student group to the second student group based on the first performance score.

15. The method of claim 14, the method further comprising:

obtaining, by the computer system, student information relating to a plurality of students registered to take the course during the course term;

generating, by the computer system, based on one or more grouping criteria and the student information, an initial grouping of the plurality of students, the initial grouping comprising at least the first group and the second group.

16. The method of claim 15, the method further comprising:

determining, by the computer system, based on the student information, a characteristic for the first student, the second student, and a third student in the second student group;

determining, by the computer system, that the characteristic for the first student is different than the characteristic of the second student and is the same as the characteristic for the third student, wherein the determination that the first student should be moved to the second student group is based further on the determination that the characteristic for the first student is different than the characteristic of the second student and is the same as the characteristic for the third student.

17. The method of claim 14, wherein monitoring at least the first chat message session comprises:

counting, by the computer system, a number of messages from the first student, wherein the first communication score is based on the number of messages.

18. The method of claim 17, wherein counting the number of messages from the first student comprises:

parsing, by the computer system, each of the messages in the first chat message session;

identifying, by the computer system, the messages in the first chat message session that are from the student and directed to the instructor based on the parse, wherein the first communication score is based on the identified messages from the student and directed to the instructor.

19. The method of claim 18, wherein identifying the messages in the first chat message session that are from the student and directed to the instructor comprises:

identifying, by the computer system, inquiries from the first student to the instructor, wherein the first communication score is based on the number of inquiries from the first student to the instructor.

20. The method of claim 17, wherein counting the number of messages from the first student comprises:

parsing, by the computer system, each of the messages in the first chat message session;

identifying, by the computer system, the messages in the first chat message session that are from the student to another student based on the parse, wherein the first communication score is based on the identified messages from the student and directed to another student.

21. The method of claim 14, the method further comprising:
monitoring, by the computer system, online social interactions between the first student and at least one other student in the first group;
generating, by the computer system, a social score based on the online social interactions, wherein the first performance score is based further on the social score.

22. The method of claim 21, wherein the first student user interface further comprises social display option configured to receive an indication from another student in the first group that the first student should be recognized, and wherein monitoring the online social interactions comprises:
determining, by the computer system, a number of times that an indication from another student in the first group that the first student should be recognized has been received, wherein the social score is based on the number of times that an indication from another student in the first group that the first student should be recognized has been received.

23. The method of claim 21, wherein monitoring online social interactions between the first student and at least one other student in the first group comprises:
determining, by the computer system, a number of chat messages between the first student and the at least one other student, wherein the social score is based on the number of chat messages.

24. The method of claim 14, the method further comprising:
generating, by the computer system, a second performance score for the second student; and
determining, by the computer system, that the second student should be moved to the first group based on the second performance score.

25. The method of claim 24, the method further comprising:
generating, by the computer system, a first ranking of the first student in the first group based on the first performance score;
generating, by the computer system, a second ranking of the second student in the second group based on the second performance score; and
determining, by the computer system, that the first student and the second student should be dynamically regrouped based on the first ranking and the second ranking, wherein the determination that the first student should be moved to the second group based on the first performance score and the determination that the second student should be moved to the first group based on the second performance score is based on the determination that the first student and the second student should be dynamically regrouped.

26. The method of claim 14, the method further comprising:
generating, by the computer system, a first ranking of the first student in the first group based on the first performance score;
determining, by the computer system, that the first ranking falls below a threshold ranking value, wherein the determination that the first student should be moved from the first student group to the second student group is based on the determination that the first ranking falls below the threshold ranking value.

* * * * *